United States Patent
Nakajima

(10) Patent No.: US 11,269,740 B2
(45) Date of Patent: Mar. 8, 2022

(54) DATA LINKAGE SYSTEM AND PROCESSING MONITORING SYSTEM

(71) Applicant: KYOCERA Document Solutions Inc., Osaka (JP)

(72) Inventor: Koki Nakajima, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/183,509

(22) Filed: Feb. 24, 2021

(65) Prior Publication Data

US 2021/0271575 A1 Sep. 2, 2021

(30) Foreign Application Priority Data

Feb. 28, 2020 (JP) .............................. JP2020-034412

(51) Int. Cl.
| | | |
|---|---|---|
| *G06F 11/07* | (2006.01) | |
| *G06F 11/14* | (2006.01) | |
| *G06F 11/34* | (2006.01) | |
| *G06F 11/30* | (2006.01) | |

(52) U.S. Cl.
CPC ...... *G06F 11/1471* (2013.01); *G06F 11/3006* (2013.01); *G06F 11/3476* (2013.01); *G06F 2201/805* (2013.01)

(58) Field of Classification Search
CPC ............. G06F 11/1471; G06F 11/3006; G06F 11/3476; G06F 2201/805
USPC ........................................................... 714/16
See application file for complete search history.

(56) References Cited

U.S. PATENT DOCUMENTS

| | | | |
|---|---|---|---|
| 2004/0010490 A1* | 1/2004 | Mikami | G06F 11/0727 |
| 2012/0084597 A1* | 4/2012 | Yasui | G06F 11/1482 |
| | | | 714/4.11 |
| 2017/0039644 A1* | 2/2017 | Palmer | G06Q 40/04 |
| 2020/0286148 A1* | 9/2020 | Kagiwada | H04L 67/2823 |

FOREIGN PATENT DOCUMENTS

| | | | | |
|---|---|---|---|---|
| CN | 104081248 A | * | 10/2014 | ........... G06T 3/4038 |
| JP | 2016-006624 | | 1/2016 | |

* cited by examiner

*Primary Examiner* — Chae M Ko
(74) *Attorney, Agent, or Firm* — Lex IP Meister, PLLC

(57) ABSTRACT

A data linkage system including a data collection system that collects data held by an information system and a data storage system that stores data held by a plurality of the information systems and collected by the data collection system includes a processing monitoring system that monitors processing at each stage on data in the data linkage system, and when processing which failed is detected, the processing monitoring system has this processing re-executed.

6 Claims, 16 Drawing Sheets

FIG. 13

90 DATA MANAGEMENT TABLE

| TRANSACTION ID | PROCESSING ID | STORAGE TYPE | STORAGE NAME | LAST UPDATE DATE AND TIME | PROCESSING NAME | PROCESSING STATE |
|---|---|---|---|---|---|---|
| ... | ... | ... | ... | ... | ... | ... |
| 231 | 156 | PRIMARY STORAGE | Blob-357 | 2019-10-28 21:00:01:00 | Masking | Processing |
| 231 | 153 | SECONDARY STORAGE | Blob-415 | 2019-10-28 21:00:10:00 | Transfer | Processing |
| 231 | 155 | PRIMARY STORAGE | Blob-356 | 2019-10-28 21:00:15:00 | Masking | Error |
| 231 | 153 | SECONDARY STORAGE | Blob-415 | 2019-10-28 21:00:15:00 | Transfer | Completed |
| 231 | 156 | PRIMARY STORAGE | Blob-357 | 2019-10-28 21:00:20:00 | Masking | Completed |
| 231 | 143 | SECONDARY STORAGE | Blob-405 | 2019-10-28 21:00:20:00 | Transfer | Processing |
| 231 | 152 | SECONDARY STORAGE | Blob-414 | 2019-10-28 21:00:25:00 | Transfer | Completed |
| 231 | 157 | PRIMARY STORAGE | Blob-358 | 2019-10-28 21:00:30:00 | Masking | Processing |
| 231 | 156 | SECONDARY STORAGE | Blob-418 | 2019-10-28 21:00:35:00 | Transfer | Processing |
| 231 | 157 | PRIMARY STORAGE | Blob-358 | 2019-10-28 21:00:45:00 | Masking | Error |
| 231 | 156 | SECONDARY STORAGE | Blob-418 | 2019-10-28 21:00:50:00 | Transfer | Completed |
| 231 | 154 | PRIMARY STORAGE | Blob-355 | 2019-10-28 21:01:00:00 | Masking | Completed |
| 231 | 151 | PRIMARY STORAGE | Blob-413 | 2019-10-28 21:01:05:00 | Transfer | Processing |
| 231 | 150 | SECONDARY STORAGE | Blob-412 | 2019-10-28 21:01:10:00 | Transfer | Completed |
| ... | ... | ... | ... | ... | ... | ... |

DATA LINKAGE SYSTEM AND PROCESSING MONITORING SYSTEM

INCORPORATION BY REFERENCE

This application is based upon, and claims the benefit of priority from, corresponding Japanese Patent Application No. 2020-034412 filed in the Japan Patent Office on Feb. 28, 2020, the entire contents of which are incorporated herein by reference.

BACKGROUND

Field of the Invention

The present disclosure relates to a data linkage system and a processing monitoring system that collect and store data held by a plurality of information systems.

Description of Related Art

Conventionally, an information processing system that links with a plurality of external systems is known.

SUMMARY

The data linkage system of the present disclosure is a data linkage system including a data collection system that collects data held by an information system and a data storage system that stores the data held by a plurality of the information systems and collected by the data collection system and includes a processing monitoring system that monitors processing at each stage on the data in the data linkage system, and the processing monitoring system is characterized in that, when the processing which failed is detected, the processing monitoring system has this processing re-executed.

The processing monitoring system of the present disclosure is a processing monitoring system that monitors processing at each stage on the data in the data linkage system including the data collection system that collects data held by the information system and the data storage system that stores the data held by a plurality of the information systems and collected by the data collection system, and the processing monitoring system is characterized in that, when the processing which failed is detected, the processing monitoring system has this processing re-executed.

BRIEF DESCRIPTION OF THE DRAWINGS

FIG. 13 is a diagram showing an example of a data management table used in the operation shown in FIG. 12;

DETAILED DESCRIPTION

An embodiment of the present disclosure will be described below using the accompanying drawings.

First, configuration of a system according to the embodiment of the present disclosure will be explained.

Figure 1:
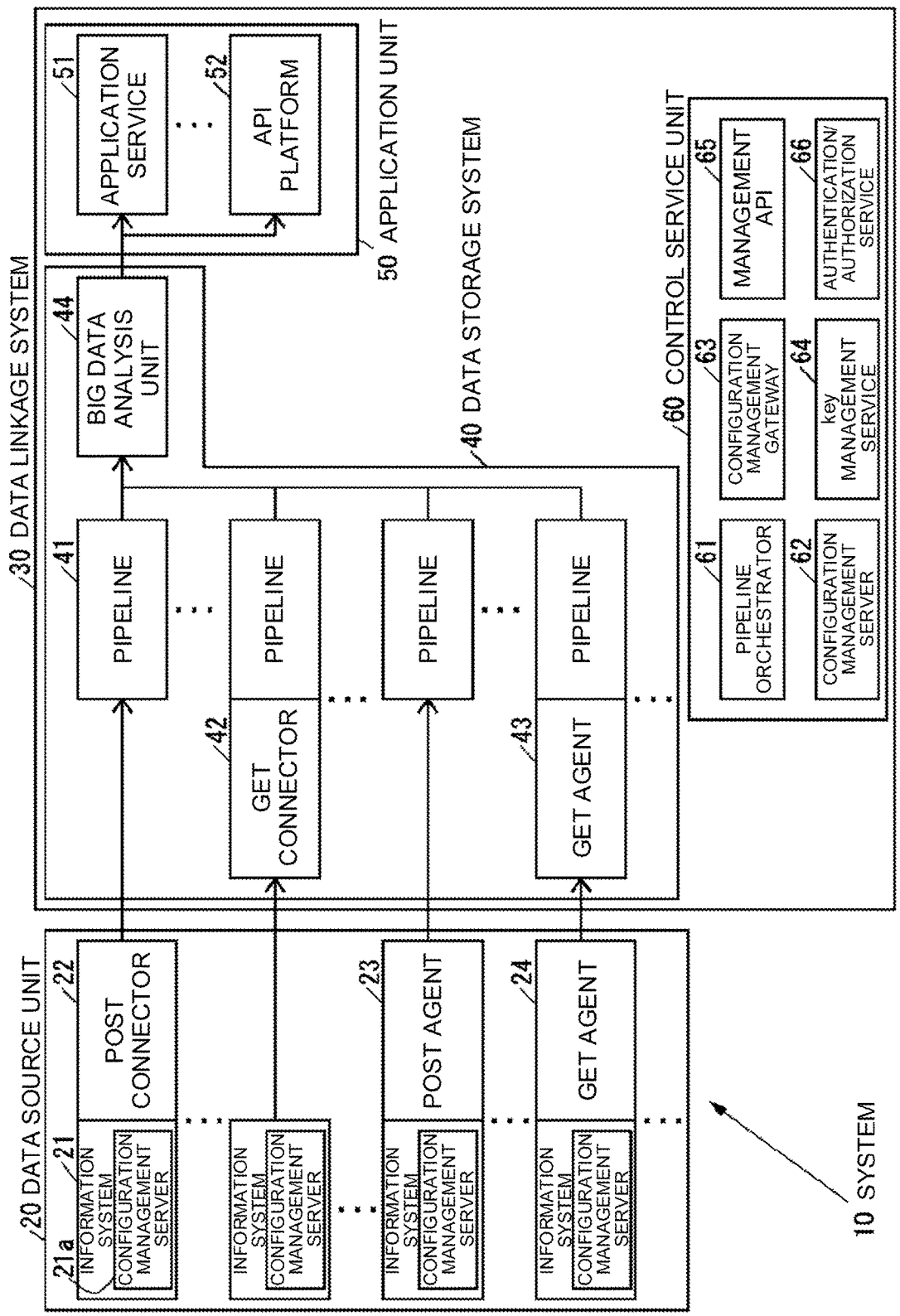
FIG. 1 is a block diagram of a system according to one embodiment of the present disclosure.

FIG. 1 is a block diagram of a system 10 according to the present embodiment.

As shown in FIG. 1, the system 10 includes a data source unit 20 that produces data and a data linkage system 30 that links the data generated by the data source unit 20.

The data source unit 20 includes an information system 21 that produces data. The information system 21 includes a configuration management server 21a that stores the configuration and settings of the information system 21. The data source unit 20 may include at least one information system in addition to the information system 21. Examples of the information system are IoT (Internet of Things) systems such as remote management systems that remotely manage image forming apparatuses such as MFP (Multifunction Peripheral) and printers and in-house systems such as ERP (Enterprise Resource Planning) and production management systems. Each of the information systems may be configured by one computer or may be configured by a plurality of computers. The information system may hold a file of structured data. The information system may hold a file of unstructured data. The information system may hold a database of structured data.

The data source unit 20 includes a POST connector 22 as the data collection system that acquires a file of structured data or unstructured data held by the information system and transmits the acquired file to a pipeline which will be described later of the data linkage system 30. The data source unit 20 may include at least one POST connector having the same configuration as the POST connector 22 in addition to the POST connector 22. The POST connector may be configured by a computer that constitutes an information system in which the POST connector itself acquires files. The POST connector is also configuration of the data linkage system 30.

The data source unit 20 includes a POST agent 23 as the data collection system that acquires structured data from a database of the structured data held by the information system and transmits the acquired structured data to a pipeline which will be described later of the data linkage system 30. The data source unit 20 may include at least one POST agent having the same configuration as the POST agent 23 in addition to the POST agent 23. The POST agent may be configured by a computer that constitutes an information system in which the POST agent itself acquires structured data. The POST agent is also configuration of the data linkage system 30.

The data source unit 20 includes a GET agent 24 as the data collection system that generates structured data for linkage on the basis of the data held by the information system. The data source unit 20 may include at least one GET agent having the same configuration as the GET agent 24 in addition to the GET agent 24. The GET agent may be configured by a computer that constitutes an information system that holds the data that is a source of generation of the structured data for linkage. The GET agent is also configuration of the data linkage system 30.

The data linkage system 30 includes a data storage system 40 that stores data generated by the data source unit 20, an application unit 50 that uses the data stored in the data storage system 40, and a control service unit 60 that executes various controls on the data storage system 40 and the application unit 50.

The data storage system 40 includes a pipeline 41 that stores the data generated by the data source unit 20. The data storage system 40 may include at least one pipeline in addition to the pipeline 41. Since the data configuration in the information system may be different for each information system, the data storage system 40 basically includes a pipeline for each information system. Each of the pipelines may be configured by one computer or may be configured by a plurality of computers.

Figure 2:
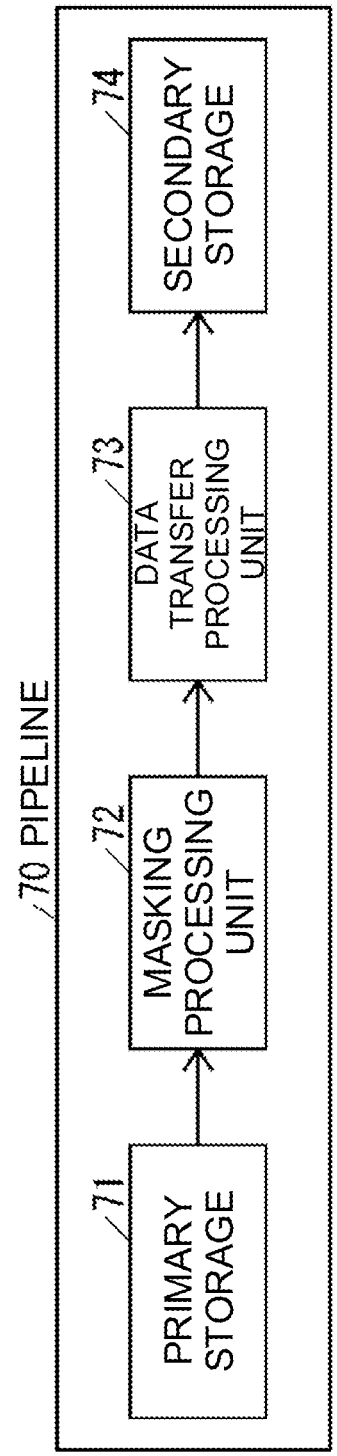
FIG. 2 is a block diagram of a pipeline included in the data storage system shown in FIG. 1.

FIG. 2 is a block diagram of a pipeline 70 included in the data storage system 40.

As shown in FIG. 2, the pipeline 70 includes a primary storage 71 having a storage area for storing data received from the POST connector, the POST agent, the GET connector which will be described later, or a GET agent which will be described later, a masking processing unit 72 as the data conversion system that executes masking processing as data conversion processing for data related to privacy such as personal information of a user of the information system in the data stored in the primary storage 71, a data transfer processing unit 73 that executes data transfer processing for transferring data for which the masking processing has been executed by the masking processing unit 72 to a big data analysis unit 44 (see FIG. 1) which will be described later, and a secondary storage 74 having a storage area for storing data to be transferred to the big data analysis unit 44. The reason why the primary storage 71 is provided is that in the data processing, if the processing fails in a process after the process of storing the data in the primary storage 71 such as processes of masking processing and a data transfer processing, re-execution of the failed processing using the data stored in the primary storage 71 is made possible without retransmitting the data from the data source unit 20 to the data linkage system 30, which has a high network communication cost. The primary storage 71 and the secondary storage 74 are not merely storage devices but are systems capable of executing various types of processing which will be described later.

As shown in FIG. 1, the data storage system 40 includes a GET connector 42 as the data collection system that acquires a file of structured data or unstructured data held by the information system and links the acquired file to the pipeline. The data storage system 40 may include at least one GET connector having the same configuration as the GET connector 42 in addition to the GET connector 42. The GET connector may be configured by a computer that constitutes a pipeline in which the GET connector itself links files.

The system 10 includes a POST connector in the data source unit 20 for an information system that does not support the acquisition of structured data or unstructured data files from the data storage system 40 side. On the other hand, the system 10 includes the GET connector in the data storage system 40 for an information system that supports the acquisition of a file of structured data or unstructured data from the data storage system 40 side.

The data storage system 40 includes a GET agent 43 as a data collection system that acquires structured data generated by the GET agent and links the acquired structured data to a pipeline. The data storage system 40 may include at least one GET agent having the same configuration as the GET agent 43 in addition to the GET agent 43. The GET agent may be configured by a computer that constitutes a pipeline in which the GET agent itself links structured data.

The system 10 includes a POST agent in the data source unit 20 for an information system that does not support the acquisition of structured data from the data storage system 40 side. On the other hand, the system 10 includes a GET agent in the data source unit 20 and a GET agent in the data storage system 40 for an information system that supports the acquisition of structured data from the data storage system 40 side.

The data storage system 40 includes a big data analysis unit 44 as a data conversion system that executes final conversion processing as data conversion processing for converting data stored by a plurality of pipelines into a form that can be searched or aggregated in a query language such as a database language such as SQL. The big data analysis unit 44 can also execute a search or aggregation in response to a search request or an aggregation request from the application unit 50 side on the data for which the final conversion processing has been executed. The big data analysis unit 44 may be configured by one computer or may be configured by a plurality of computers.

The final conversion processing may include data integration processing for integrating data of a plurality of information systems as data conversion processing. When the system 10 includes a remote management system located in Asia to remotely manage a large number of image forming apparatuses located in Asia, a remote management system located in Europe to remotely manage a large number of image forming apparatuses located in Europe, and a remote management system located in the United States to remotely manage a large number of image forming apparatuses located in the United States as information systems, each of these three remote management systems includes a device management table that manages an image forming apparatus managed by the remote management system itself. The device management table is information indicating various types of information of the image forming apparatus in association with an ID assigned to each image forming apparatus. Here, since each of the three remote management systems has its own device management table, there is a possibility that the same ID is assigned to different image forming apparatuses among the device management tables of the three remote management systems. Therefore, when the big data analysis unit 44 integrates the device management tables of the three remote management systems to generate one device management table, the ID of the image forming apparatus is reassigned so as not to cause duplication.

The application unit 50 includes an application service 51 that executes a specific operation instructed by a user such as data display or data analysis by using the data managed by the big data analysis unit 44. The application unit 50 may include at least one application service in addition to the application service 51. Each of the application services may be configured by one computer or may be configured by a plurality of computers.

The application unit 50 includes an API platform 52 that provides an API (Application Program Interface) that executes a specific operation by using the data managed by the big data analysis unit 44. The API platform 52 may be configured by one computer or may be configured by a plurality of computers. For example, as the API provided by the API platform 52, there are an API that transmits data of a remaining amount of consumables collected by the remote management system from the image forming apparatus to a consumables ordering system outside of the system 10, that orders consumables when the remaining amount of consumables such as toner of the image forming apparatus is equal to or less than a specific amount and an API that transmits various types of data collected by the remote management system from the image forming apparatus to a failure prediction system outside of the system 10, that predicts the failure of the image forming apparatus.

The control service unit 60 includes a pipeline orchestrator 61 as a processing monitoring system that monitors the processing of each stage of data in the data source unit 20, the data storage system 40, and the application unit 50. Each of the pipeline orchestrators 61 may be configured by one computer or may be configured by a plurality of computers.

Figure 3:
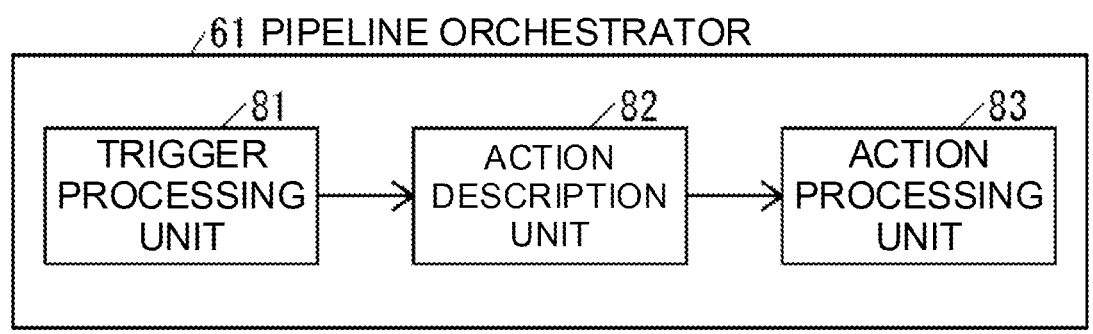
FIG. 3 is a block diagram of a pipeline orchestrator shown in FIG. 1.

FIG. 3 is a block diagram of the pipeline orchestrator 61.

As shown in FIG. 3, the pipeline orchestrator 61 includes a trigger processing unit 81 that processes a trigger of an operation of the pipeline orchestrator 61, an action description unit 82 that stores a plurality of operation scenarios of the pipeline orchestrator 61, and an action processing unit 83 that executes the operation of the pipeline orchestrator 61.

As shown in FIG. 1, the control service unit 60 includes a configuration management server 62 that stores configuration and settings of the data storage system 40 and automatically executes deployment as necessary. The configuration management server 62 may be configured by one computer or may be configured by a plurality of computers. The configuration management server 62 configures a configuration change system that changes the configuration of the data linkage system 30.

The control service unit 60 includes a configuration management gateway 63 connected to the configuration management server of the information system and collects information for detecting a change in the configuration of the database or unstructured data in the information system, that is, a change in the configuration of the data in the information system. The configuration management gateway 63 may be configured by one computer or may be configured by a plurality of computers.

The control service unit 60 includes a key management service 64 that encrypts and stores security information such as key information and connection character strings required for linking each system such as an information system. The key management service 64 may be configured by one computer or may be configured by a plurality of computers.

The control service unit 60 includes a management API 65 that receives requests from the data storage system 40 and the application unit 50. The management API 65 may be configured by one computer or may be configured by a plurality of computers.

The control service unit 60 includes an authentication/authorization service 66 that executes authentication/authorization of the application service of the application unit 50. The authentication/authorization service 66 may be configured by one computer or may be configured by a plurality of computers. The authentication/authorization service 66 can confirm, for example, whether or not the application service is permitted to request the update of the data of the information system stored in the data storage system 40.

Next, the operation of the system 10 will be described.

First, the operation of the system 10 when the data held by the information system 21 is collected by the POST connector 22 and transmitted to the pipeline 41 will be described.

Figure 4:
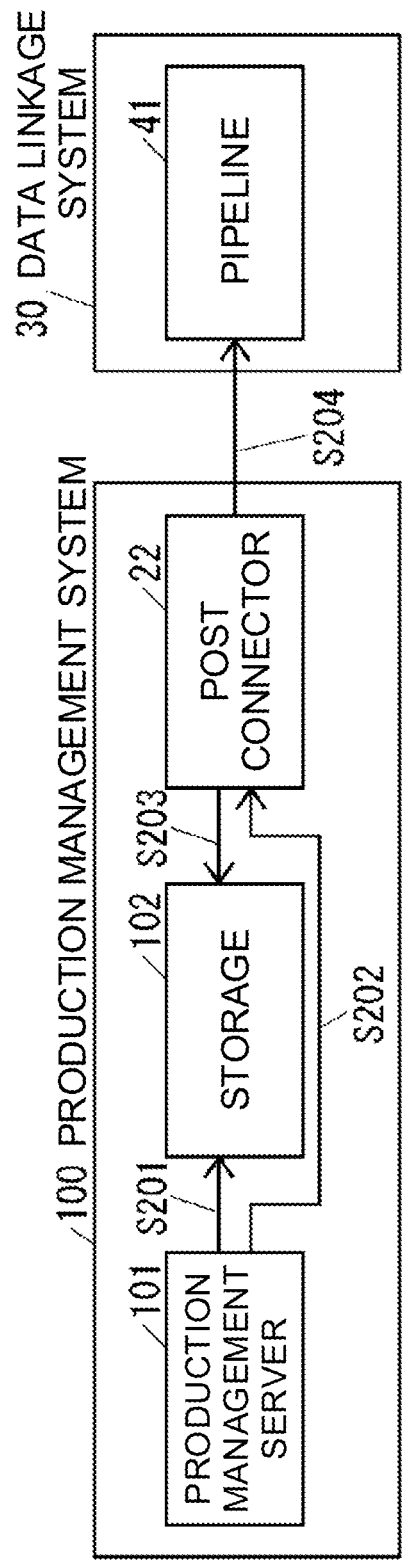
FIG. 4 is a diagram showing an example of an operation flow of the system shown in FIG. 1 when data held by an information system is collected by a POST connector and transmitted to the pipeline.

FIG. 4 is a diagram showing an example of an operation flow of the system 10 when the data held by the information system 21 is collected by the POST connector 22 and transmitted to the pipeline 41.

In the example shown in FIG. 4, the information system 21 is a production management system 100.

As shown in FIG. 4, the production management system 100 includes a production management server 101 that executes production management and a storage 102 that stores a file of structured data or unstructured data.

The production management server 101 executes backup for storing structured data or unstructured data files in the storage 102 by batch processing (S201).

After the processing at S201, the production management server 101 instructs the POST connector 22 to transfer the file stored in the storage 102 at S201 to the pipeline (S202). Here, the production management server 101 includes identification information of the file stored in the storage 102 at S201 in the instruction at S202.

Upon receipt of the instruction at S202, the POST connector 22 acquires the file specified by the identification information included in the instruction at S202 from the storage 102 (S203).

After the processing at S203, the POST connector 22 transmits the file acquired at S203 to the pipeline 41 with which the POST connector 22 itself is associated (S204).

Figure 5:
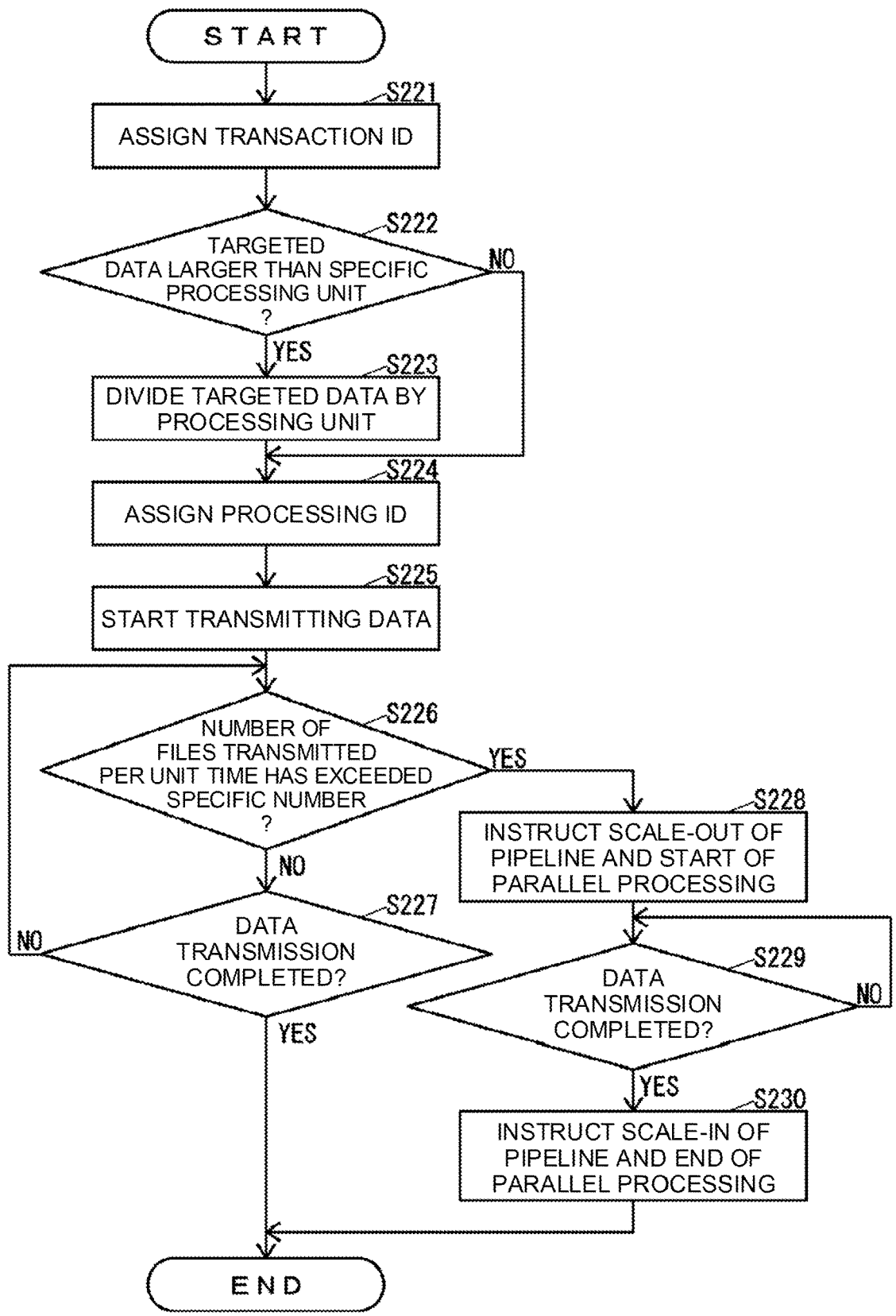
FIG. 5 is a flowchart of the operation of the POST connector shown in FIG. 4 when a file is transmitted to the pipeline.

FIG. 5 is a flowchart of the operation of the POST connector 22 when a file is transmitted to the pipeline 41.

As shown in FIG. 5, the POST connector 22 assigns a transaction ID as identification information to the current transaction for transmitting a file to the pipeline 41 (S221). Here, the transaction ID is, for example, a numerical value and is incremented each time a new transaction occurs in the POST connector 22.

The POST connector 22 determines whether or not the data targeted for the current transaction is larger than a specific unit of processing (S222). Here, the specific unit of processing is, for example, a specific number of files.

When the POST connector 22 determines at S222 that the data targeted for the current transaction is larger than the specific unit of processing, the POST connector 22 divides the data targeted for the current transaction into specific units of processing (S223).

When the POST connector 22 determines at S222 that the data targeted for the current transaction is equal to or smaller than the specific unit of processing, or when the processing at S223 is finished, the POST connector 22 assigns the processing ID as identification information to each data in the unit of processing (S224). Here, the processing ID is, for example, a numerical value and is incremented each time new data of a specific unit of processing is generated in the POST connector 22.

After the processing at S224, the POST connector 22 starts transmitting the data targeted for the current transaction to the pipeline 41 for each unit of processing (S225).

Next, the POST connector 22 determines whether or not the number of files transmitted to the pipeline 41 per specific unit time has exceeded the specific number (S226).

When the POST connector 22 determines at S226 that the number of files transmitted to the pipeline 41 per specific unit time does not exceed the specific number, the POST connector 22 determines whether or not the transmission of the data targeted for the current transaction to the pipeline 41 has been completed (S227).

When the POST connector 22 determines at S227 that the transmission of the data targeted for the current transaction to the pipeline 41 has not been completed, the POST connector 22 executes the processing at S226.

When the POST connector 22 determines at S227 that the transmission of the data targeted for the current transaction to the pipeline 41 has been completed, the POST connector 22 ends the operation shown in FIG. 5.

When the POST connector 22 determines at S226 that the number of files transmitted to the pipeline 41 per specific unit time has exceeded the specific number, the POST connector 22 instructs scale-out of the pipeline 41 and start of parallel processing by the pipeline 41 to the pipeline orchestrator 61 (S228). Therefore, the pipeline orchestrator 61 scales out the pipeline 41 to a specific state in accordance with the instruction at S228 and instructs the pipeline 41 to start parallel processing.

Next, the POST connector 22 determines whether or not the transmission of the data targeted for the current transaction to the pipeline 41 has been completed until it determines that the transaction of the data targeted for the current transaction to the pipeline 41 has been completed (S229).

When the POST connector 22 determines at S229 that transmission of the data targeted for the current transaction to the pipeline 41 has been completed, the POST connector 22 instructs the scale-in of the pipeline 41 and the end of parallel processing by the pipeline 41 to the pipeline orchestrator 61 (S230). Therefore, the pipeline orchestrator 61 scales in the pipeline 41 to the original state in accordance with the instruction at S230 and instructs the pipeline 41 to end the parallel processing.

The POST connector 22 ends the operation shown in FIG. 5 after the processing at S230.

Next, the operation of the system 10 when the data held by the information system is collected by the GET connector 42 and passed to the pipeline will be described.

Figure 6:
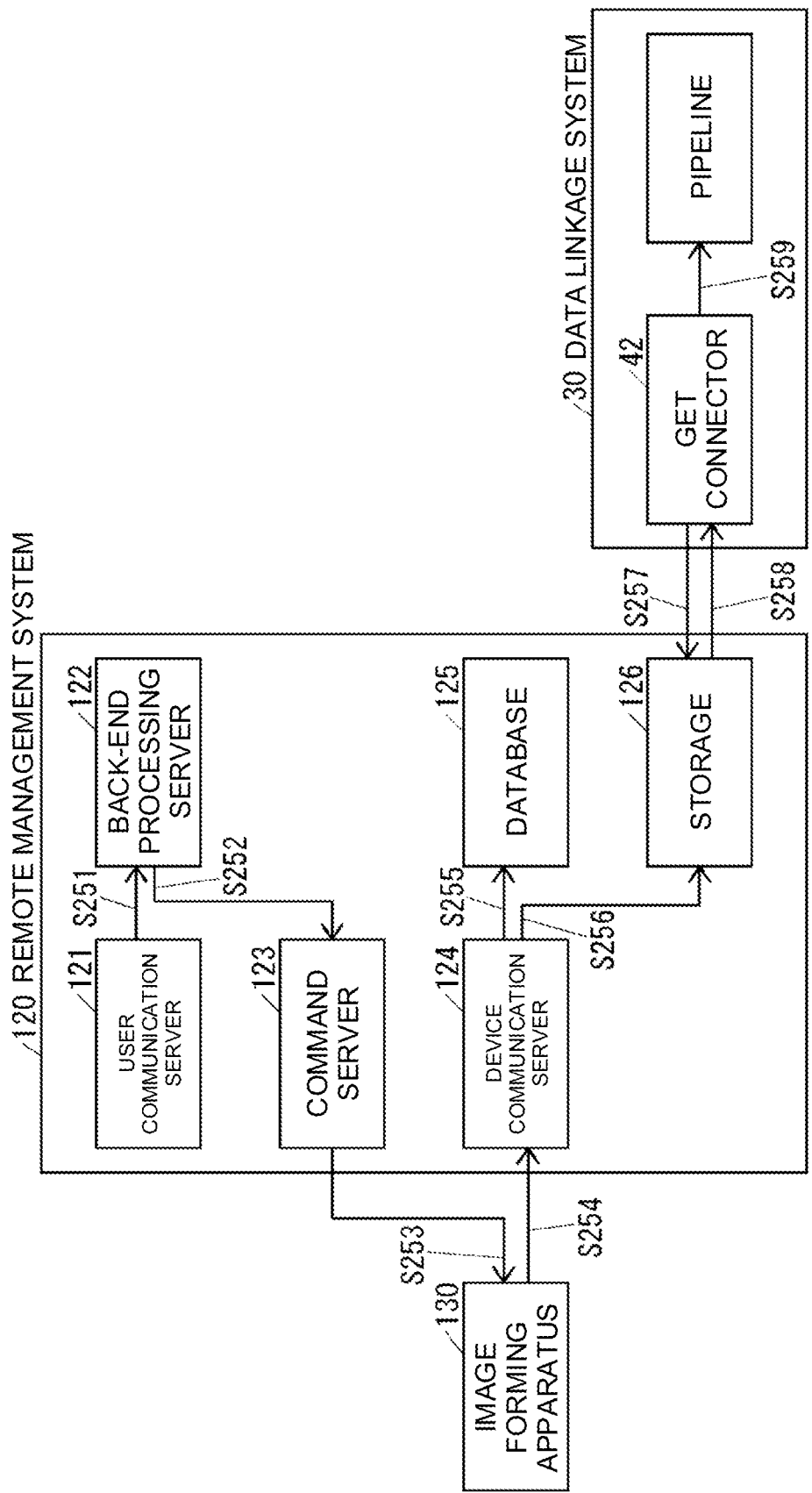
FIG. 6 is a diagram showing an example of the operation flow of the system shown in FIG. 1 when the data held by the information system is collected by a GET connector and passed to the pipeline.

FIG. 6 is a diagram showing an example of the operation flow of the system 10 when the data held by the information system is collected by the GET connector 42 and passed to the pipeline.

In the example shown in FIG. 6, the information system is the remote management system 120 of the image forming apparatus. The example shown in FIG. 6 is an example of an operation when the user instructs the remote management system 120 to acquire a maintenance report including sensor information including output values of various sensors of the image forming apparatus.

As shown in FIG. 6, the remote management system 120 includes a user communication server 121 that receives instructions from users, a back-end processing server 122 that executes processing in response to instructions from users, a command server 123 that transmits various commands to the image forming apparatus, a device communication server 124 that receives data from the image forming apparatus, the database 125 that stores various types of data of the image forming apparatus to be managed by the remote management system 120, and a storage 126 that stores the files of structured data or unstructured data. The remote management system 120 manages a large number of image forming apparatuses including the image forming apparatus 130. The database 125 stores the device ID as the identification information of the image forming apparatus for the image forming apparatus to be managed by the remote management system 120.

The user of the remote management system 120 can transmit an instruction to acquire the maintenance report of the image forming apparatus 130 to the remote management system 120. This instruction includes the device ID of the image forming apparatus 130 from which the maintenance report is acquired. When the user communication server 121 of the remote management system 120 receives the instruction to acquire the maintenance report, the user communication server 121 transmits the received instruction to the back-end processing server 122 (S251).

When the back-end processing server 122 receives the instruction to acquire the maintenance report transmitted by the user communication server 121 at S251, the back-end processing server 122 transmits a request for transmission of the maintenance report acquisition command for acquiring the maintenance report to the command server 123 (S252). This request includes the device ID that was included in the instruction to acquire the maintenance report.

When the command server 123 receives the request for transmission of the maintenance report acquisition command transmitted by the back-end processing server 122 at S252, the command server 123 transmits the maintenance report acquisition command to the image forming apparatus 130 specified by the device ID included in the request (S253).

When the image forming apparatus 130 receives the maintenance report acquisition command transmitted by the command server 123 at S253, the image forming apparatus 130 transmits the maintenance report of the image forming apparatus 130 itself to the remote management system 120 (S254). Here, the image forming apparatus 130 includes the device ID of the image forming apparatus 130 itself in the maintenance report.

When the device communication server 124 of the remote management system 120 receives the maintenance report transmitted by the image forming apparatus 130 at S254, the device communication server 124 determines whether or not the device ID included in the received maintenance report is included in the database 125. (S255).

When the device communication server 124 determines at S255 that the device ID included in the received maintenance report is included in the database 125, the device communication server 124 stores the received maintenance report in the storage 126 (S256).

The GET connector 42 of the data linkage system 30 periodically searches the storage 126 of the remote management system 120, which is an information system with which the GET connector 42 itself is associated, with respect to the maintenance report file of the specific image forming apparatus (S257).

When the GET connector 42 confirms that the maintenance report file of the specific image forming apparatus 130 exists in the storage 126, the GET connector 42 acquires this file from the storage 126 (S258).

After the processing at S258, the GET connector 42 passes the file acquired at S258 to the pipeline with which the GET connector 42 itself is associated (S259).

When passing a file to the pipeline, the GET connector 42 executes an operation similar to the operation shown in FIG. 5. That is, the GET connector 42 assigns a transaction ID to the current transaction. Further, the GET connector 42 divides the target data of the current transaction into specific units of processing when the target data of the current transaction is larger than the specific units of processing. Further, the GET connector 42 assigns a processing ID to each processing unit of data. In addition, when the number of files passed to the pipeline per specific unit of time has exceeded the specific number, the GET connector 42 instructs the scale-out of the pipeline and the start of parallel processing by the pipeline to the pipeline orchestrator 61 and then, when passing of the data targeted for the current transaction to the pipeline is completed, the GET connector 42 instructs the scale-in of the pipeline and the end of parallel processing by the pipeline to the pipeline orchestrator 61.

Next, the operation of the system 10 when the data held by the information system is collected by the POST agent 23 and transmitted to the pipeline will be described.

Figure 7:
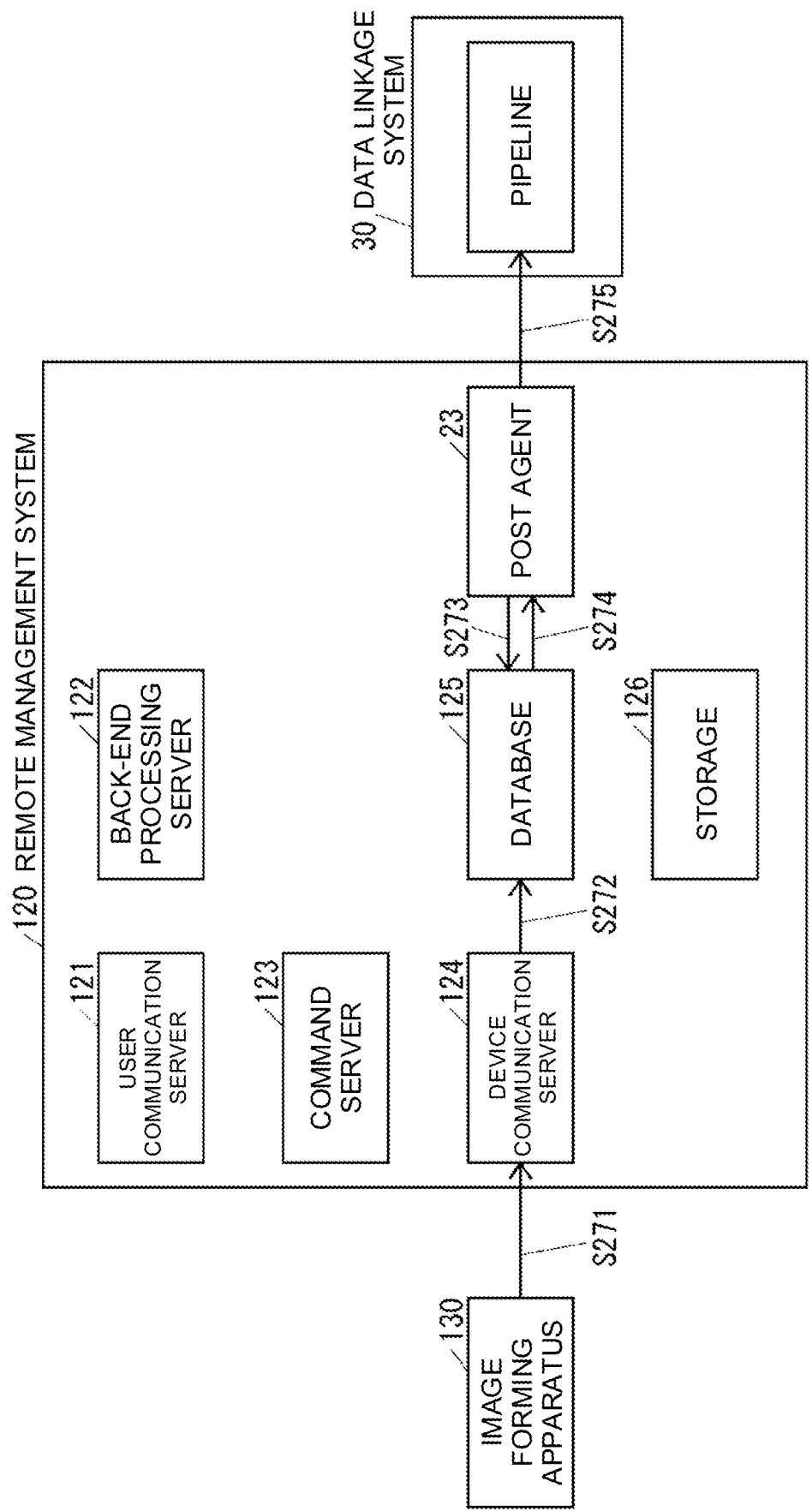
FIG. 7 is a diagram showing an example of the operation flow of the system shown in FIG. 1 when the data held by the information system is collected by a POST agent and transmitted to the pipeline.

FIG. 7 is a diagram showing an example of the operation flow of the system 10 when the data held by the information system is collected by the POST agent 23 and transmitted to the pipeline.

In the example shown in FIG. 7, the information system is the remote management system 120 of the image forming apparatus similarly to the example shown in FIG. 6. The database 125 stores event information indicating an event that has occurred in the image forming apparatus managed by the remote management system 120. The example shown in FIG. 7 is an example of the operation of the system 10 when the image forming apparatus 130 managed by the remote management system 120 transmits event information indicating an event generated in the image forming apparatus 130 itself to the remote management system 120.

When an event such as an error occurs in the image forming apparatus 130 itself, the image forming apparatus 130 transmits event information indicating the event occurring in the image forming apparatus 130 itself to the device communication server 124 of the remote management system 120 (S271). For example, as an error that occurs in the image forming apparatus 130, there are a paper jam indicating that paper is jammed inside the image forming apparatus 130 and a cover open indicating that the cover of the image forming apparatus 130 is in the open state.

When the device communication server 124 of the remote management system 120 receives the event information transmitted by the image forming apparatus 130 at S271, the device communication server 124 updates the database 125 with the received event information (S272).

The POST agent 23 confirms at a specific timing whether or not the event information stored in the database 125 has been changed (S273). The confirmation at S273 may be executed, for example, at the time of periodic backup of the database 125, may be executed when the database 125 itself detects a change in the database 125, or may be executed when the API for change of the database 125 is called in the remote management system 120.

When the POST agent 23 detects a change in the event information in the database 125 as a result of the confirmation at S273, the POST agent 23 acquires data indicating the content of the change in the event information from the database 125 (S274).

After the processing at S274, the POST agent 23 transmits the data acquired at S274 to the pipeline of the data linkage system 30 with which the POST agent 23 itself is associated (S275).

Figure 8:
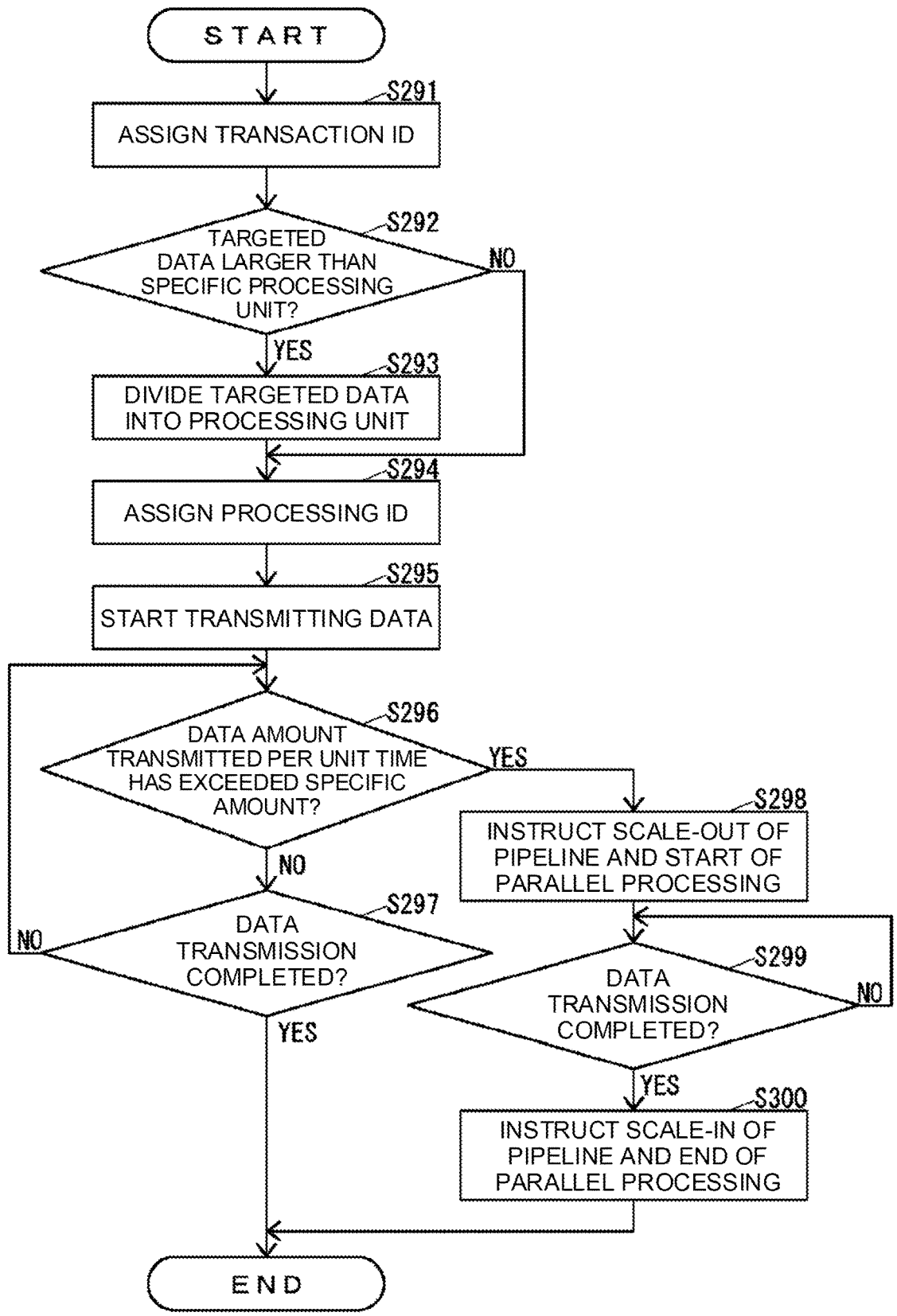
FIG. 8 is a flowchart of the operation of the POST agent shown in FIG. 7 when a file is transmitted to the pipeline.

FIG. 8 is a flowchart of the operation of the POST agent 23 when a file is transmitted to the pipeline.

As shown in FIG. 8, the POST agent 23 assigns a transaction ID to the current transaction that transmits a file to the pipeline (S291). Here, the transaction ID is, for example, a numerical value and is incremented each time a new transaction occurs in the POST agent 23.

The POST agent 23 determines whether or not the data targeted for the current transaction is larger than a specific unit of processing (S292). Here, the specific unit of processing is, for example, a specific number of tables.

When the POST agent 23 determines at S292 that the data targeted for the current transaction is larger than the specific unit of processing, the POST agent 23 divides the data targeted for the current transaction into specific units of processing (S293).

When the POST agent 23 determines at S292 that the data targeted for the current transaction is equal to or smaller than a specific unit of processing, or when the processing at S293 is finished, the POST agent 23 assigns the processing ID as identification information to each data of the unit of processing (S294). Here, the processing ID is, for example, a numerical value, and is incremented each time data of a specific unit of processing newly occurs in the POST agent 23 in the same transaction.

After the processing at S294, the POST agent 23 starts transmission of the data targeted for the current transaction to the pipeline for each unit of processing (S295).

Next, the POST agent 23 determines whether or not the amount of data transmitted to the pipeline per specific unit of time has exceeded the specific amount (S296).

When the POST agent 23 determines at S296 that the amount of data transmitted to the pipeline per specific unit of time does not exceed the specific amount, the POST agent 23 determines whether or not transmission of the data targeted for the current transaction to the pipeline has been completed (S297).

When the POST agent 23 determines at S297 that the transmission of the data targeted for the current transaction to the pipeline has not been completed, the POST agent 23 executes the processing at S296.

When the POST agent 23 determines at S297 that the transmission of the data targeted for the current transaction to the pipeline has been completed, the POST agent 23 ends the operation shown in FIG. 8.

When the POST agent 23 determines at S296 that the amount of data transmitted to the pipeline per specific unit of time has exceeded the specific amount, the POST agent 23 instructs scale-out of the pipeline and start of parallel processing by the pipeline to the pipeline orchestrator 61 (S298). Therefore, the pipeline orchestrator 61 scales out the pipeline to a specific state in accordance with the instruction at S298 and instructs the pipeline to start parallel processing.

Then, the POST agent 23 determines whether or not transmission of the data targeted for the current transaction to the pipeline has been completed until the POST agent 23 determines that the transmission of the data targeted for the current transaction to the pipeline has been completed (S299).

When the POST agent 23 determines at S299 that the transmission of the data targeted for the current transaction to the pipeline has been completed, the POST agent 23 instructs the scale-in of the pipeline and the end of parallel processing by the pipeline to the pipeline orchestrator 61 (S300). Therefore, the pipeline orchestrator 61 scales in the pipeline to the original state in accordance with the instruction at S300 and instructs the pipeline to end the parallel processing.

The POST agent 23 ends the operation shown in FIG. 8 after the processing at S300.

Next, the operation of the system 10 when the data held by the information system is collected by the GET agent 43 and passed to the pipeline will be described.

Figure 9:
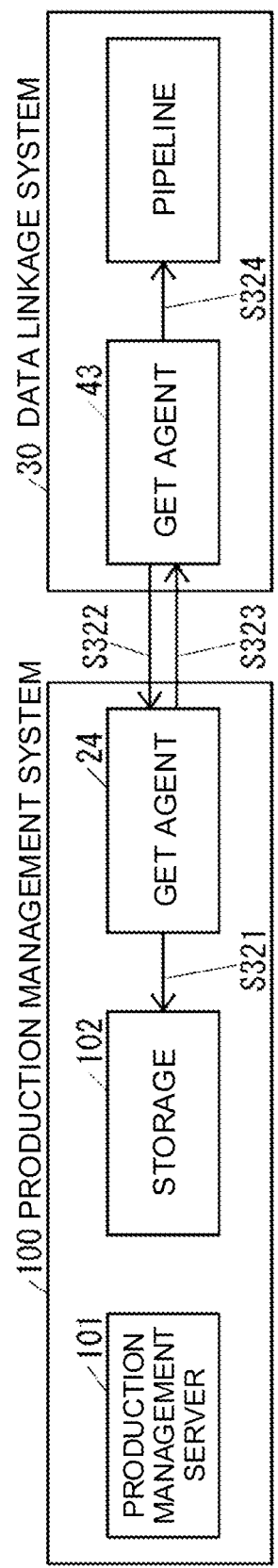
FIG. 9 is a diagram showing an example of the operation flow of the system shown in FIG. 1 when the data held by the information system is collected by a GET agent and passed to the pipeline.

FIG. 9 is a diagram showing an example of the operation flow of the system 10 when the data held by the information system is collected by the GET agent 43 and passed to the pipeline.

In the example shown in FIG. 9, the information system is the production management system 100 similarly to the example shown in FIG. 4.

As shown in FIG. 9, the GET agent 24 of the production management system 100 generates structured data for linkage at a specific timing on the basis of the data stored in the storage 102 (S321).

The GET agent 43 of the data linkage system 30 periodically inquires the GET agent 24 of the production management system 100, which is an information system with which the GET agent 43 itself is associated, for presence or absence of structured data for linkage (S322).

When the GET agent 43 confirms that the structured data for linkage exists in the GET agent 24, the GET agent 43 acquires the structured data from the GET agent 24 (S323).

After the processing at S323, the GET agent 43 passes the structured data acquired at S323 to the pipeline with which the GET agent 43 itself is associated (S324).

When a file is to be passed to the pipeline, the GET agent 43 executes an operation similar to the operation shown in FIG. 8. That is, the GET agent 43 assigns a transaction ID to the current transaction. Further, the GET agent 43 divides the data targeted for the current transaction into specific units of processing when the data targeted for the current transaction is larger than the specific unit of processing. Further, the GET agent 43 assigns a processing ID to each unit of processing of the data. In addition, when the amount of data passed to the pipeline per specific unit of time has exceeded the specific amount, the GET agent 43 instructs the scale-out of the pipeline and the start of parallel processing by the pipeline to the pipeline orchestrator 61 and then, when passing of the data targeted for the current transaction to the pipeline has been completed, the GET agent 43 instructs the scale-in of the pipeline and the end of parallel processing by the pipeline to the pipeline orchestrator 61.

Next, the operation of the data linkage system 30 when the data storage system 40 stores data will be described.

Figure 10:
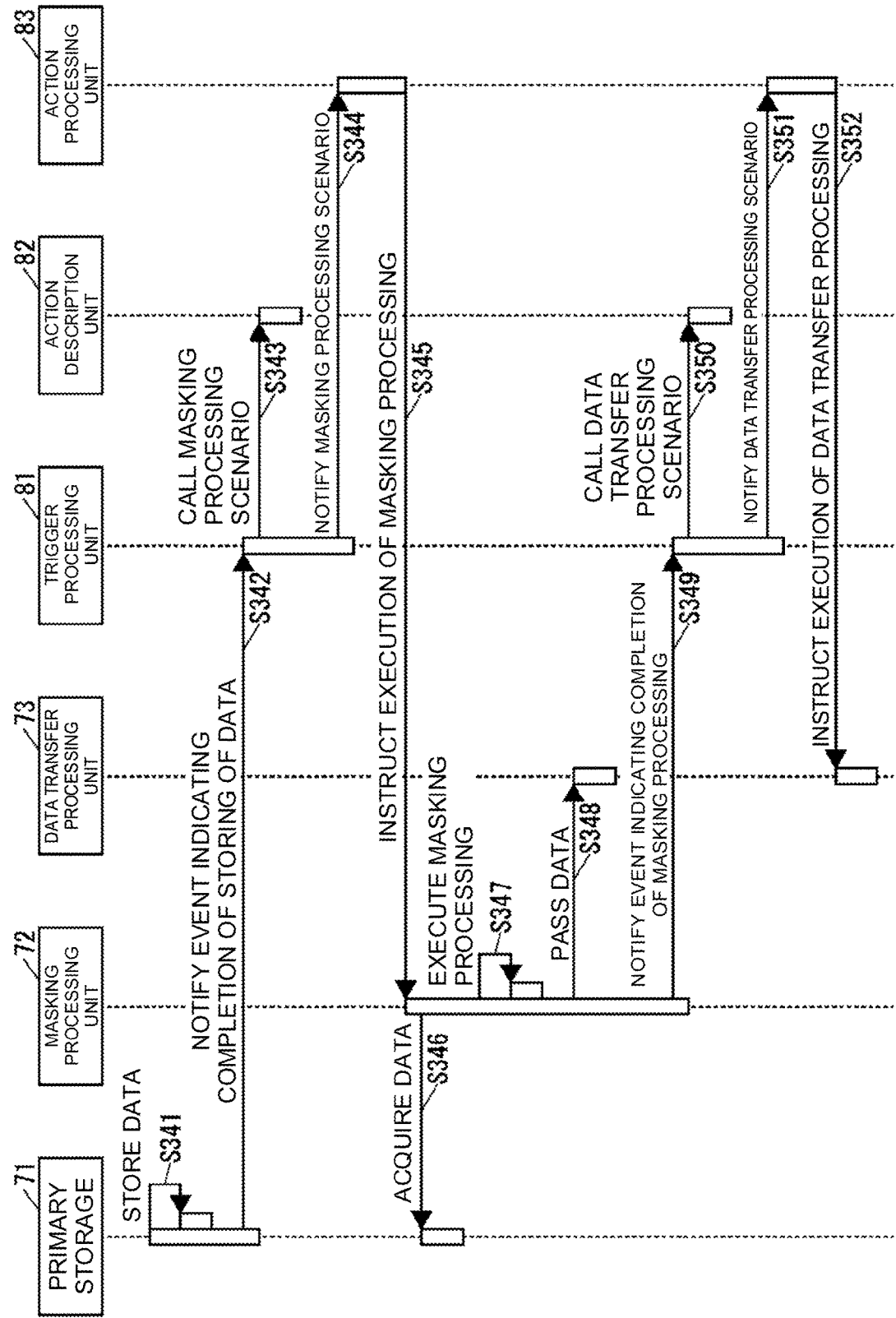
FIG. 10 is a sequence diagram of a part of the operation of the data linkage system shown in FIG. 1 when the data storage system stores data.

FIG. 10 is a sequence diagram of a part of the operation of the data linkage system 30 when the data storage system 40 stores data.

As shown in FIG. 10, when the primary storage 71 of the pipeline 70 receives the data of a specific unit of processing from the data collection system, that is, the POST connector, POST agent, GET connector or GET agent, it stores the received data (S341). Next, the primary storage 71 notifies the pipeline orchestrator 61 of an event indicating the completion of data storage (S342).

When the trigger processing unit 81 of the pipeline orchestrator 61 receives the event notified by the primary storage 71 at S342, the trigger processing unit 81 analyzes the content of this event, calls a scenario corresponding to this event, that is, a scenario of the masking processing from the action description unit 82 (S343), and notifies the scenario called at S343 to the action processing unit 83 (S344). Therefore, the action processing unit 83 instructs the masking processing unit 72 of the pipeline 70 to execute the processing based on the scenario notified at S344, that is, to execute the masking processing on the data stored in the primary storage 71 at S341 (S345).

Upon receipt of the instruction at S345, the masking processing unit 72 executes the masking processing on the data stored in the primary storage 71 at S341. That is, the masking processing unit 72 first acquires the data stored in the primary storage 71 at S341 from the primary storage 71 (S346). Next, the masking processing unit 72 executes the masking processing on the data acquired at S346 (S347). Next, the masking processing unit 72 passes the data for which the masking processing was executed at S347 to the data transfer processing unit 73 (S348). Then, the masking processing unit 72 notifies the pipeline orchestrator 61 of an event indicating completion of the masking processing (S349).

When the trigger processing unit 81 of the pipeline orchestrator 61 receives the event notified by the masking processing unit 72 at S349, the trigger processing unit 81 analyzes the content of this event, calls a scenario corresponding to this event, that is, a scenario of the data transfer processing from the action description unit 82 (S350), and notifies the scenario called at S350 to the action processing unit 83 (S351). Therefore, the action processing unit 83 instructs the data transfer processing unit 73 of the pipeline 70 to execute the processing based on the scenario notified at S351, that is, to execute the data transfer processing on the data for which the masking processing was executed at S347 (S352).

Figure 11:
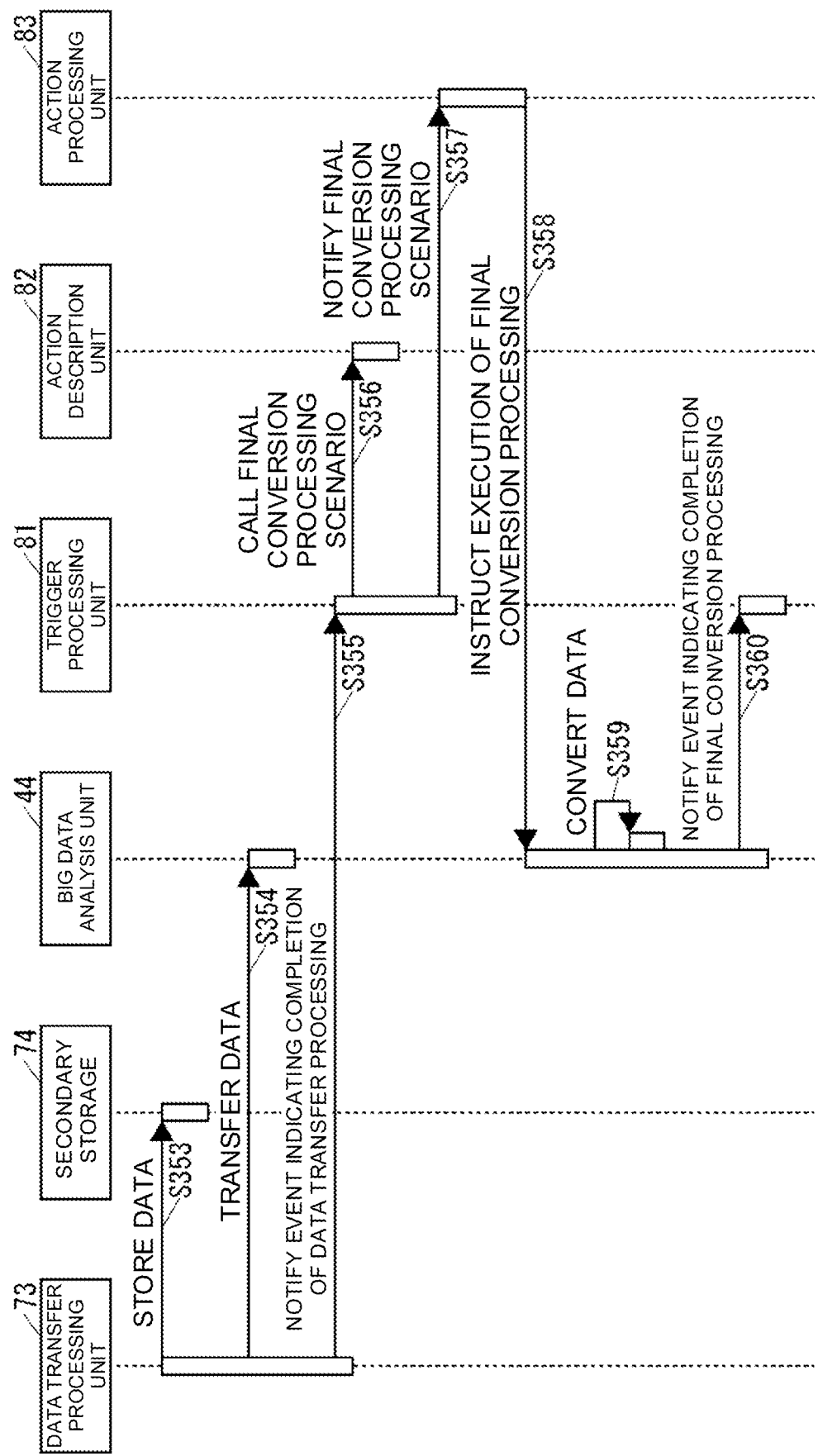
FIG. 11 is a sequence diagram of operations following the operations shown in FIG. 10.

FIG. 11 is a sequence diagram of operations following the operations shown in FIG. 10.

As shown in FIG. 11, when the data transfer processing unit 73 receives the instruction at S352, the data transfer processing unit 73 executes the data transfer processing on the data for which the masking processing has been executed by the masking processing unit 72. That is, the data transfer processing unit 73 first stores the data passed from the masking processing unit 72 at S348 as data for transfer to the big data analysis unit 44 in the secondary storage 74 (S353). Next, the data transfer processing unit 73 transfers the data stored in the secondary storage 74 at S353 to the big data analysis unit 44 via the secondary storage 74 (S354). Then, the data transfer processing unit 73 notifies the pipeline orchestrator 61 of an event indicating the completion of the data transfer processing (S355).

When the trigger processing unit 81 of the pipeline orchestrator 61 receives the event notified by the data transfer processing unit 73 at S355, the trigger processing unit 81 analyzes the content of this event, calls a scenario corresponding to this event, that is, a scenario of final conversion processing from the action description unit 82 (S356), and notifies the scenario called at S356 to the action processing unit 83 (S357). Therefore, the action processing unit 83 instructs the big data analysis unit 44 to execute the processing based on the scenario notified at S357, that is, to execute the final conversion processing for the data stored in the secondary storage 74 at S354 (S358).

Upon receipt of the instruction at S358, the big data analysis unit 44 executes the final conversion processing on the data transferred by the data transfer processing unit 73. That is, the big data analysis unit 44 first converts the data transferred from the data transfer processing unit 73 at S354 into a form that can be searched and aggregated in a specific query language (S359). Then, the big data analysis unit 44 notifies the pipeline orchestrator 61 of an event indicating the completion of the final conversion processing (S360).

Next, the operation of the masking processing unit 72 in the masking processing at S347 will be described.

Figure 12:
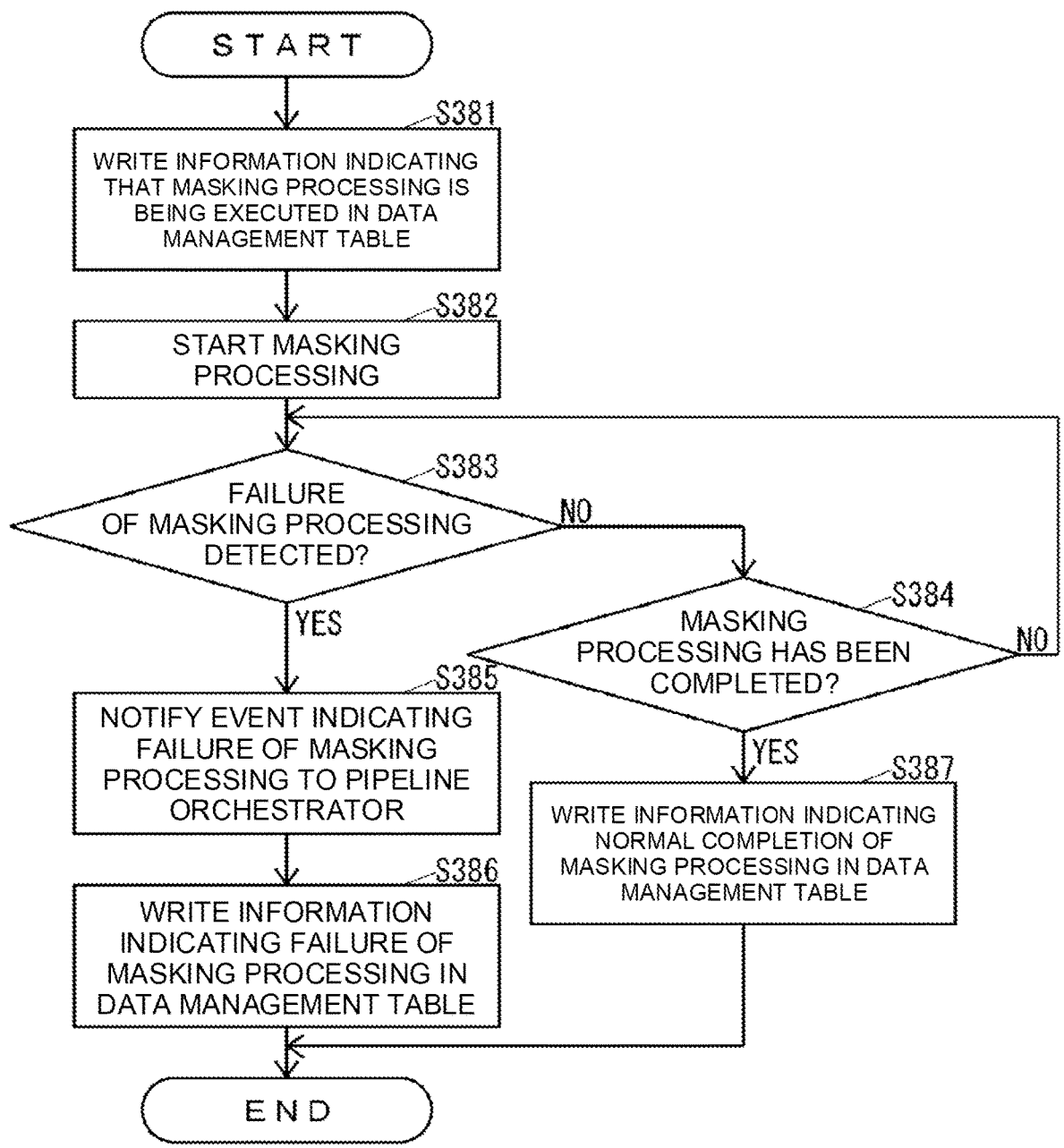
FIG. 12 is a flowchart of the operation of a masking processing unit in masking processing shown in FIG. 10.

FIG. 12 is a flowchart of the operation of the masking processing unit 72 in the masking processing.

The masking processing unit 72 executes the operation shown in FIG. 12 for each unit of processing of the data.

As shown in FIG. 12, the masking processing unit 72 writes information indicating that the masking processing is being executed for the data to be masked this time in a data management table 90 (see FIG. 13) as data management information for managing history of the data processing to be linked (S381).

FIG. 13 is a diagram showing an example of the data management table 90 used in the operation shown in FIG. 12.

The data management table 90 shown in FIG. 13 includes a transaction ID, a processing ID, a storage type indicating a storage in which data identified by combination of the transaction ID and the processing ID is stored, a storage name indicating the name of the file when the data identified by the combination of the transaction ID and the processing ID is stored in the storage, the last update date and time indicating the date and time when the information was stored in the data management table 90, a processing name indicating the name of the processing for the data identified by the combination of the transaction ID and the processing ID, and a processing state indicating the state of the processing indicated by the processing name.

There are a primary storage and a secondary storage in the storage type.

The processing name includes Masking indicating the masking processing and Transfer indicating the data transfer processing. At S381, Masking is written.

In the processing state, there are Processing indicating that the processing indicated by the processing name is being executed, Completed indicating that the processing indicated by the processing name has been completed normally, and Error indicating that the processing indicated by the processing name has failed. At S381, Processing is written.

As shown in FIG. 12, the masking processing unit 72 starts the masking processing on the target data after the processing at S381 (S382).

Next, the masking processing unit 72 determines whether or not the failure of the masking processing started at S382, that is, the failure of data conversion has been detected (S383).

When the masking processing unit 72 determines at S383 that the failure of the masking processing has not been detected, it determines whether or not the masking processing started at S382 has been completed (S384).

When the masking processing unit 72 determines at S384 that the masking processing has not been completed, the masking processing unit 72 executes the processing at S383.

When the masking processing unit 72 determines at S383 that it has detected the failure of the masking processing, it notifies the pipeline orchestrator 61 of an event indicating the failure of the masking processing (S385). This event includes the transaction ID and processing ID of the target data.

Next, the masking processing unit 72 writes information indicating that the masking processing has failed with respect to the data to be masked this time in the data management table 90 (S386), and ends the operation shown in FIG. 12. The "processing name" and the "processing state" in the information written at S386 are "Masking" and "Error", respectively.

When the masking processing unit 72 determines at S384 that the masking processing has been completed, the masking processing unit 72 writes information indicating that the masking processing has been normally completed for the data to be masked this time in the data management table 90 (S387) and ends the operation shown in FIG. 12. The "processing name" and "processing state" in the information written at S387 are "Masking" and "Completed", respectively.

Although the operation of the masking processing unit 72 in the masking processing at S347 has been described above, the same applies to the operation of the data transfer processing unit 73 in the data transfer processing at S354 and the operation of the big data analysis unit 44 in the final conversion processing at S359.

Next, the operation of the data linkage system 30 when the masking processing unit 72 fails to process the data will be described.

Figure 14:
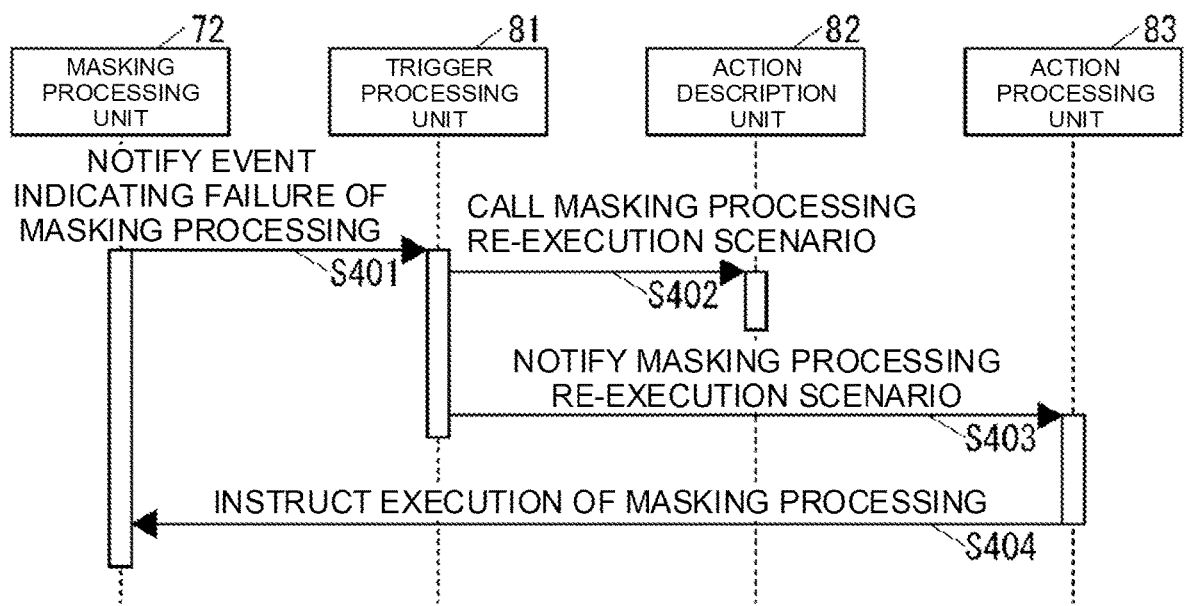
FIG. 14 is a sequence diagram of the operation of the data linkage system shown in FIG. 1 when the masking processing unit fails to process the data.

FIG. 14 is a sequence diagram of the operation of the data linkage system 30 when the masking processing unit 72 fails to process the data.

If the masking processing fails during the execution of the operation shown in FIG. 10, the masking processing unit 72 notifies the pipeline orchestrator 61 of an event indicating the failure of the masking processing as shown in FIG. 14 (S401). The notification at S401 corresponds to the notification at S385 (see FIG. 12).

When the trigger processing unit 81 of the pipeline orchestrator 61 receives the event notified by the masking processing unit 72 at S401, the trigger processing unit 81 analyzes the content of this event and calls a scenario corresponding to this event, that is, the scenario of re-execution of the masking processing from the action description unit 82 (S402) and notifies the scenario called at S402 to the action processing unit 83 (S403). Therefore, the action processing unit 83 instructs the masking processing unit 72 of the pipeline 70 to execute the processing based on the scenario notified at S403, that is, to execute the masking processing on the data stored in the primary storage 71 at S341 (S404). Here, the action processing unit 83 specifies the information whose final update date and time is the latest in the information included in the data management table 90 for the data specified by the combination of the transaction ID and the processing ID included in the event notified by the masking processing unit 72 at S401, and when the processing state in the specified information is not Completed, that is, Processing or Error, the action processing unit 83 instructs execution of the masking processing for this data to the masking processing unit 72 of the pipeline 70.

After the processing at S404, the processing after the processing at S346 shown in FIG. 10 is executed.

In the above, the operation of the data linkage system 30 when the masking processing unit 72 fails to process the data has been described, but even when configuration other than the masking processing unit 72 in the data storage system 40 such as the data transfer processing unit 73 and the big data analysis unit 44 fails to process data, or when configuration other than the data storage system 40 in the data linkage system 30 such as a data collection system fails to process data, the data linkage system 30 can re-execute the processing by the same mechanism.

The data stored in the primary storage 71 is not frequently used. Therefore, the primary storage 71 may move the data for which a specific period has passed since it was stored in the primary storage 71 itself to a specific storage area outside the pipeline. When the primary storage 71 moves the data to a specific storage area outside the pipeline, the primary storage 71 may compress the data and then, move the data. The primary storage 71 moves the data to a specific storage area outside the pipeline, and then, notifies the combination of the transaction ID and the processing ID of the data having been moved to the specific storage area outside the pipeline to the pipeline orchestrator 61. When the pipeline orchestrator 61 instructs the masking processing unit 72 of the pipeline 70 to execute the masking processing on the data having been moved to a specific storage area outside the pipeline, the pipeline orchestrator 61 instructs the primary storage 71 to restore this data to the primary storage 71. Therefore, the primary storage 71 acquires the data specified by the pipeline orchestrator 61 from a specific storage area outside the pipeline and stores it in the primary storage 71 itself. Here, when the data specified by the pipeline orchestrator 61 is compressed, the primary storage 71 decompresses this data and then, stores the data in the primary storage 71 itself.

In the above, the data stored in the primary storage 71 has been described, but the same applies to the data stored in the secondary storage 74. That is, the secondary storage 74 may move the data for which a specific period has passed since it was stored in the secondary storage 74 itself to a specific storage area outside the pipeline and restores the data having been moved to the specific storage area outside the pipeline to the secondary storage 74 itself in accordance with the instruction of the pipeline orchestrator 61. When the secondary storage 74 moves the data to a specific storage area outside the pipeline, the secondary storage 74 may compress the data and then, move the data.

Next, the operation of the data linkage system 30 when the application unit 50 requests the update of the specific information system stored in the data storage system 40 will be described.

Figure 15:
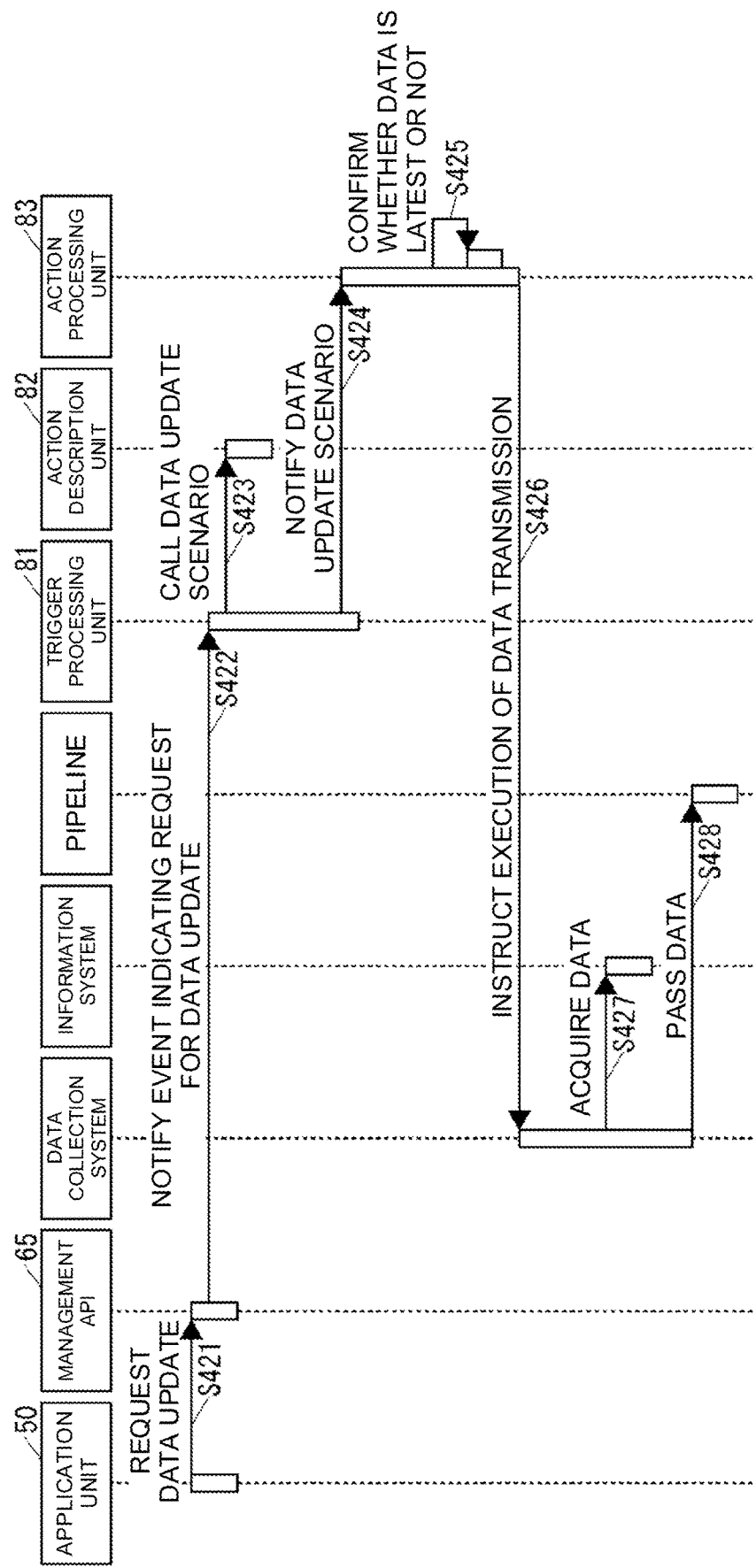
FIG. 15 is a sequence diagram of the operation of the data linkage system shown in FIG. 1 when an application unit requests update of the data of a specific information system stored in the data storage system.

FIG. 15 is a sequence diagram of the operation of the data linkage system 30 when the application unit 50 requests the update of the data of a specific information system (hereinafter, referred to as "target information system" in the description of the operation shown in FIG. 15) stored in the data storage system 40.

As the cases where the application unit 50 requests the update of the data of the target information system stored in the data storage system 40, for example, there is a case where, in response to an instruction from a user of the application service of the application unit 50, this application service requests the update of the data of the target information system stored in the data storage system 40.

As shown in FIG. 15, the application unit 50 requests the management API 65 to update the data of the target information system stored in the data storage system 40 (S421).

When the management API 65 receives the request at S421, it notifies the pipeline orchestrator 61 of an event indicating the received request (S422).

When the trigger processing unit 81 of the pipeline orchestrator 61 receives the event notified by the management API 65 at S422, the trigger processing unit 81 analyzes the content of this event, calls a scenario corresponding to this event, that is, a scenario of the update of the data of the target information system stored in the data storage system 40 from the action description unit 82 (S423), and notifies the scenario called at S423 to the action processing unit 83 (S424). Therefore, the action processing unit 83 executes the processing based on the scenario notified at S424. That is, the action processing unit 83 first confirms whether or not the data of the target information system stored in the data storage system 40 is the latest (S425). As a result of the confirmation at S425, if the data of the target information system stored in the data storage system 40 is not the latest, the action processing unit 83 instructs transmission of the data of the target information system to the data collection system for the target information system (S426).

Therefore, the data collection system acquires data from the target information system (S427) and passes the data acquired at S427 to the pipeline associated with the data collection system itself (S428).

After the processing at S428, the processing shown in FIGS. 10 and 11 is executed.

When the application unit 50 requests the update of the data of the target information system stored in the data storage system 40, whereby the pipeline 70 and the big data analysis unit 44 process the data, the final conversion processing by the big data analysis unit 44 is preferably completed early. Therefore, regarding the processing at S354, the data transfer processing unit 73 may transfer the data passed from the masking processing unit 72 at S348 directly to the big data analysis unit 44 instead of transfer of the data stored in the secondary storage 74 at S353 to the big data analysis unit 44 via the secondary storage 74.

In the above, the update of the data of the target information system stored in the data storage system 40 has been described. Here, the data linkage system 30 can also update only specific data among the data of the target information system stored in the data storage system 40. For example, the data linkage system 30 can also update only data in a specific device management table among the data of the target information system stored in the data storage system 40.

Next, the operation of the data linkage system 30 when it changes its own configuration in response to a change in the configuration of a specific information system will be described.

Figure 16:
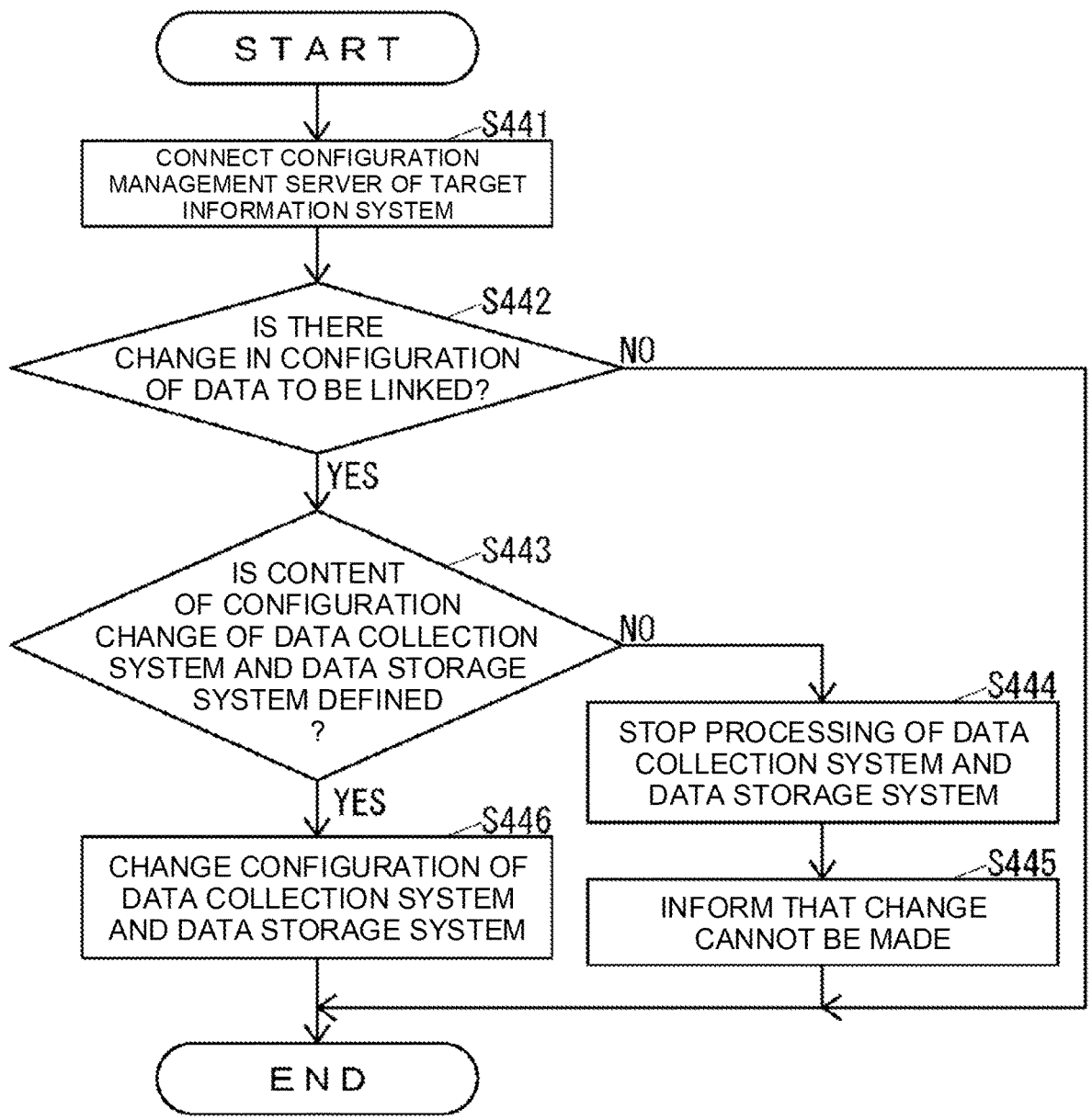
FIG. 16 is a flowchart of the operation of the data linkage system shown in FIG. 1 when its own configuration is changed in response to a change in the configuration of a specific information system.

FIG. 16 is a flowchart of an operation of the data linkage system 30 when it changes its own configuration in response to a change in the configuration of a specific information system (hereinafter, referred to as "target information system" in the description of the operation shown in FIG. 16).

The configuration management gateway 63 executes the operation shown in FIG. 16 at a specific timing.

As shown in FIG. 16, the configuration management gateway 63 connects to the configuration management server of the target information system (S441) and determines whether or not there is a change in the configuration of the data to be linked on the basis of the information from the configuration management server of the target information system (S442).

When the configuration management gateway 63 determines at S442 that there is no change in the configuration of the data to be linked, the configuration management gateway 63 ends the operation shown in FIG. 16.

When it is determined at S442 that there is a change in configuration of the data to be linked, the configuration management server 62 determines whether or not the content of the change in the configuration to be changed in response to the content of the change in the configuration of the data to be linked among the configurations of the data collection system and the data storage system 40 is defined (S443). Here, the configuration management server 62 stores change content correspondence relationship information indicating the correspondence relationship between the content of the change in the configuration of the data to be linked and the content of the change in the configuration to be changed in response to the content of the change in the configuration of the data to be linked among the configurations of the data collection system and the data storage system 40. When the correspondence relationship regarding the content of the change in the configuration of the data to be linked is stored in the change content correspondence relationship information, the configuration management server 62 determines that the content of the change in the configuration to be changed in response to the content of the change in the configuration of the data to be linked among the configurations of the data collection system and the data storage system 40 is defined. On the other hand, when the correspondence relationship regarding the content of the change in the configuration of the data to be linked is not stored in the change content correspondence relationship information, the configuration management server 62 determines that the content of the change in the configuration to be changed in response to the content of the change in the configuration of the data to be linked among the configurations of the data collection system and the data storage system 40 is not defined.

When the configuration management server 62 determines at S443 that the content of the change in the configuration to be changed in response to the content of the change in the configuration of the data to be linked among the configurations of the data collection system and the data storage system 40 is not defined, the configuration management server 62 stops the processing of the data collection system and the data storage system 40 regarding the data to be linked (S444). Next, the configuration management server 62 informs that the configuration of the data linkage system 30 cannot be changed in response to the change in the configuration of the target information system to a predetermined destination such as the destination of a person in charge of the target information system, for example, (S445) and ends the operation shown in FIG. 16.

When the configuration management server 62 determines at S443 that the content of the change in the configuration to be changed in response to the content of the change in the configuration of the data to be linked among the configurations of the data collection system and the data storage system 40 is defined, the configuration management server 62 changes the configuration to be changed in response to the content of the change in the configuration of the data to be linked in the data collection system and the data storage system 40 with the content of the change defined in the change content correspondence relationship information (S446). Here, as the content of the change in the configuration of the data collection system, for example, a change in a range of data to be linked, a change in a frequency of linkage and the like can be considered. When the configuration management server 62 changes the configuration of the data collection system, the configuration management server 62 may deploy a new data collection system with the changed configuration. As the content of the change in the configuration of the data storage system 40, for example, the change in the processing content of the masking processing by the masking processing unit or the change in the processing content of the final conversion processing in the big data analysis unit 44 can be considered.

The configuration management server 62 ends the operation shown in FIG. 16 after the processing of S446.

As described above, when processing which failed is detected among the processing at each stage on the data in the data linkage system 30 itself (S401), the data linkage system 30 has this processing re-executed (S404) and thus, the data can be linked even if the processing fails during the linkage.

For example, when a failure such as a communication error with the data source unit 20 occurs, recovery from the failure, that is, re-execution of the data collection processing is executed automatically and in a minimum range in the data linkage system 30 and thus, the operating cost of the entire data linkage system 30 can be reduced even when a large amount of data is linked.

When the application unit 50 requests the pipeline orchestrator 61 to update the data stored in the data storage system 40 (S421 to S422), the data linkage system 30 has the processing of collecting the data for which the update was requested by the application unit 50 executed by the data collection system (S426) and thus, the data linkage system 30 can easily update the data stored in the data storage system 40.

In the present embodiment, the pipeline includes a masking processing unit as a data conversion system. However, the pipeline may include at least one data conversion system other than the masking processing unit in place of the masking processing unit or in addition to the masking processing unit.

What is claimed is:

1. A data linkage system comprising:
   a data collection system that collects data held by an information system and a data storage system that stores data held by a plurality of the information systems and collected by the data collection system; and
   a processing monitoring system that monitors processing at each stage, that is executed in the data linkage system on the data stored in the data storage system, wherein,
   the processing monitoring system detects failure of the processing executed on the data and instructs a processor of the failed processing to re-execute the processing on the data, the processor detecting the failure of the processing and notifying the processing monitoring system of the failure.

2. The data linkage system according to claim 1, further comprising
   an application unit that uses data stored in the data storage system, wherein,
   when update of the data stored in the data storage system is requested by the application unit, the processing monitoring system has the processing of collecting the data for which the update was requested by the application unit executed by the data collection system.

3. The data linkage system according to claim 1, wherein the processor includes a primary storage that stores the data collected by the data collection system and a data conversion system that executes a predetermined processing on target data included in the data stored in the primary storage, and
   wherein the data conversion system re-executes the predetermined processing on the target data stored in the primary storage in accordance with a re-execution instruction from the data processing monitoring system.

4. A processing monitoring system that monitors processing at each stage, that is executed on data in a data linkage system which includes a data collection system that collects data held by an information system and a data storage system that stores data held by a plurality of the information systems and collected by the data collection system, wherein the data on which the processing is executed is the data stored in the data storage system, and wherein, when the processing monitoring system detects failure of the processing executed on the data and instructs a processor of the failed processing to re-execute the processing to the data, the processor detecting the failure of the processing and notifying the processing monitoring system of the failure.

5. A data linkage system comprising:

a data collection system that collects data held by an information system;

a data storage system that stores data held by a plurality of the information systems and collected by the data collection system;

a processing monitoring system that monitors processing at each stage on data in the data linkage system; and an application unit that uses data stored in the data storage system, wherein when processing which failed is detected, the processing monitoring system has this processing re-executed, and wherein when update of the data stored in the data storage system is requested by the application unit, the processing monitoring system has the processing of collecting the data for which the update was requested by the application unit executed by the data collection system.

6. A processing monitoring system that monitors processing at each stage on data in a data linkage system which includes a data collection system that collects data held by an information system, a data storage system that stores data held by a plurality of the information systems and collected by the data collection system, and an application unit that uses data stored in the data storage system, wherein when processing which failed is detected, the processing monitoring system has this processing re-executed, and wherein when update of the data stored in the data storage system is requested by the application unit, the processing monitoring system has the processing of collecting the data for which the update was requested by the application unit executed by the data collection system.

\* \* \* \* \*